April 27, 1926.

H. LEVINE

FASTENER FOR BAGS

Filed May 1, 1925

1,582,833

Witnesses:
C. E. Wessels.

Inventor:
Harry Levine,
By Joshua R. H. Potts
his Attorney.

Patented Apr. 27, 1926.

1,582,833

UNITED STATES PATENT OFFICE.

HARRY LEVINE, OF CHICAGO, ILLINOIS.

FASTENER FOR BAGS.

Application filed May 1, 1925. Serial No. 27,127.

*To all whom it may concern:*

Be it known that I, HARRY LEVINE, a citizen of the United States, and a resident of the city of Chicago, county of Cook, and State of Illinois, have invented certain new and useful Improvements in Fasteners for Bags, of which the following is a specification.

My invention relates to fasteners for bags especially adapted for use in connection with travelling bags, kit bags and the like, for securing the sections of the bag together against opening movement, and the main object of my invention is the provision of an improved fastening device of this kind which will be highly efficient in use and economical in manufacture.

Other objects will appear hereinafter.

The invention consists in the combinations and arrangements of parts hereinafter described and claimed.

The invention will be best understood by reference to the accompanying drawings forming a part of this specification, and in which, Fig. 1 represents in perspective a fragmental and sectional view of a travelling bag provided with my improved fastener;

Figure 1:
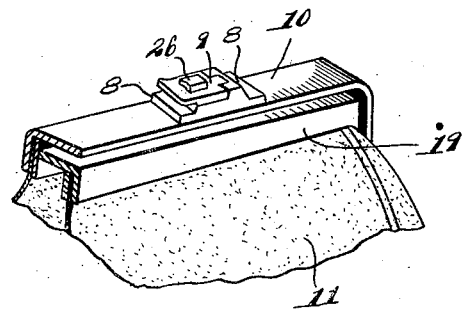
Figure 2:
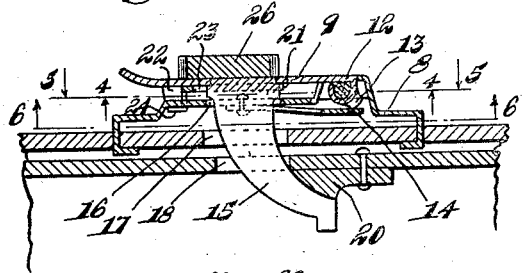
Fig. 2 represents a longitudinal section through the fastener and also through the flanges of the bag as they appear when secured together by the fastener.
Figure 3:
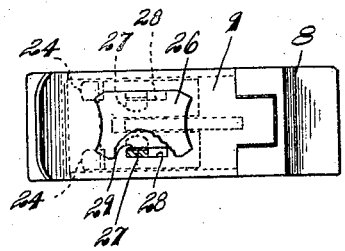
Fig. 3 is a top plan view of the fastener with parts broken away and parts shown in section.
Figure 4:
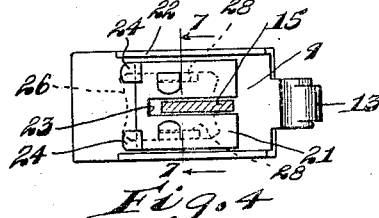
Fig. 4 represents a longitudinal section taken approximately on the line 4—4 of Fig. 2.
Figure 5:
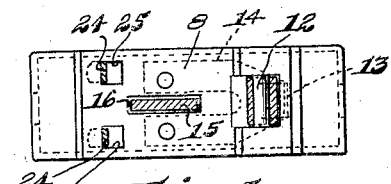
Fig. 5 is another longitudinal section, taken approximately on the line 5—5 of Fig. 2.
Figure 7:
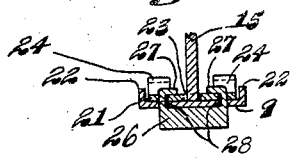
Fig. 7 is a cross section taken on the line 7—7 of Fig. 4.
Figure 6:
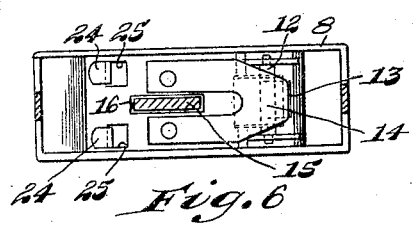
Fig. 6 represents still another longitudinal section, taken approximately on the line 6—6 of Fig. 2.

With more particular reference to the parts shown in the accompanying drawing, the numerals 8 and 9 denote hinge connected fastener elements or sections, of which the element 8 is permanently connected with the outer flange 10 of the bag 11. The fastener element 9 turns upon a hinge pin 12 carried by the element 8 and through the cooperation of a cam-like portion 13 on the element 9 and a flat spring 14 carried by said element 8, the outer element 9 is forced to close upon the inner element 8 with a snapping action. The outer element 9 carries a hook member 15 which is passed through suitable slots 16, 17 and 18 provided respectively in the inner fastener member 8, in the outer flange 10 and in the inner flange 19 of the bag. The hook member 15 when the fastener element 9 is closed down upon the fastener element 8, engages a retaining shoe 20 secured upon the underface of the bag flange 19. Fasteners of the general construction so far described are in common use, but the same frequently fail to keep the bag flanges secured together, either because of some imperfection in the fastener itself, or because of a warped or overcrowded condition of the bag which results in a loosening of the hook member.

The preferred embodiment of my invention as illustrated in the accompanying drawing, comprises a slider 21 fitting between the side flanges 22 on the underface of the fastener element 9 and slotted at 23 to move on the hook member 15. At its forward end, remote from the hinged connection between the fastener elements, said slider 21 is provided with downwardly offset catch lugs 24, which are adapted upon the closing of the fastener element 9, to pass through keeper-openings 25 provided in the fastener element 8.

As means for moving the slider in order to interlock the catch lugs 24 with the keeper-openings 25, I provide a thumb-piece 26 which is slidable upon the top surface of the fastener element 9. Said thumb-piece 26 is formed with arms 27 which work in suitable slots provided in the fastener element 9 for the purpose, the said arms 27 being also projected through slots 28 provided in the slider and then bent over upon the underface of the slider, whereby to connect the thumb-piece 26 with the slider so that these parts will move in unison. When, therefore, the fastener element 9 is closed upon the fastener element 8, the thumb-piece 26 may be moved forwardly in order to engage the catch lugs 24 with the walls of the keeper-openings 25, thereby securely locking the fastener element 9 upon the fastener element 8. In order to disengage the catch lugs, it is only necessary to move the thumb-piece 26 in a reverse direction bringing the catch lugs in a position to be withdrawn from the keeper-openings when the fastener element 9 is to be opened for the disengagement of the hook member 15 from the retaining shoe 20.

While I have illustrated and described the preferred form of construction for carrying my invention into effect, this is capable of variation and modification without departing from the spirit of my invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A fastener device for travelling bags and the like comprising a supporting element; an element hinged thereto for opening and closing movement; a slider arranged for sliding movement on the hinged element; and interlocking means provided on said slider and supporting element.

2. A fastener device for travelling bags and the like comprising a supporting element provide with a keeper-opening; an element hinged to the supporting element to close thereupon; a slider arranged on the hinged element; and a catch-lug on the slider adapted to interlock with said keeper-opening.

3. A fastener device for travelling bags and the like comprising a supporting element provided with an opening; an element hinged to the supporting element to close thereupon; a slider arranged to slide on the hinged element; and an off-set catch-lug on the slider adapted to pass through said opening and engage against the undersurface of said supporting element.

4. A fastener device for travelling bags and the like comprising hinge connected elements; a slider on one element; catch lugs carried by the slider; and keeper-means on the other of the elements adapted to receive and retain said catch lugs for locking said hinge connected elements together in closed relation, substantially as described.

5. A fastener device for travelling bags and the like comprising hinge connected elements; a slider on one element; catch lugs carried by the slider; retaining means on the other of the elements; and means for moving said slider to engage said catch lugs with said retaining means, substantially as described.

6. A fastener element for travelling bags and the like comprising a section adapted to be secured to the bag; a section hinged thereto; a slider arranged on the hinged section and provided with catch lugs; there being keeper-openings in the first named section; and means for moving the slider to interlock said catch lugs with the walls of said keeper-openings, substantially as described.

In testimony whereof I have signed my name to this specification.

HARRY LEVINE.